United States Patent Office 3,269,900
Patented August 30, 1966

3,269,900
POLYURETHANE NON-VOLATILE PESTICIDAL
COMPOSITIONS
Martin Rubin, 3218 Pauline Drive, Chevy Chase, Md.
No Drawing. Filed June 9, 1964, Ser. No. 373,848
3 Claims. (Cl. 167—42)

This application is a continuation-in-part of prior application, Serial No. 147,049 filed October 23, 1961, now abandoned.

This invention relates to plant growth and is particularly concerned with a novel and improved composition for field application of pesticides to plants.

Effectiveness of pesticides in field application depends upon a sustained presence of pesticide in effective concentrations over an extended period of time else quality or quantity (often both) of the crop suffers.

As a more practical matter the basic need is for a composition which slowly releases small quantities of a pesticide to the area around the plant throughout the growing season. Such a composition would advantageously be usable for a specific plant crop in a localized geographic area. It could be applied alone or, if desired, as part of a prepared fertilizer composition.

The principal object of the instant invention is to provide a sustained release composition for pesticides.

Briefly, the instant invention comprises a polyurethane foam composition containing at least 25% by weight thereof of an organic pesticide. Up to about 75% may be incorporated.

The term organic non-volatile pesticide as herein employed is applicable to any active material used for biologic control of unwanted organisms including in particular insecticides, fungicides, herbicides, nematocides and other biocides, plant growth regulators and the like materials utilizable in a field environment. The field environment promotes degradation and decomposition of the polyurethane foam to free therefrom the non-volatile pesticide. In particular the present invention is advantageously applicable to pesticidal materials whose water solubility otherwise precludes a sustained effect and also to normally liquid pesticidal materials. For such materials the slow release characteristics of the dry particulate polyurethane foam permit a sustained effect. Indeed, between the widely divergent possible foams (e.g., closed cell, open cell, small or large cell, etc.), pesticide concentration (i.e., 25%–75% by weight of the foam), and dosage differences, the effective duration of pesticide to a particular field crop can be predetermined closely to needs which exist over the entire growing season.

Among the biologicals specifically contemplated for practice of the present invention, mention is made illustratively of the following:

DDT
Chlordane
Dieldrin
TDE (dichlorodiphenyl dichloroethane)
Diazinon (Geigy)
Chlorobenzilate
Lindane
Malathion
Methoxychlor
Heptachlor
Gamma benzene hexachloride
Isolan (1-isopripyl-3-m-ethyl pyrazolyl-5-dimethyl carbamate)
3-methyl-pyrazolyl dimethylcarbamate
Aldrin (1,2,3,4,10,10-hexachloro-1,4,4a,5,8,8a-hexahydro-1,4-endo-exo-5,8-dimethanonaphthalene)
Endrin (1,2,3,4,10,10-hexachloro-6,7-epoxy-1,4,4a,5,6,7,8,8a-octahydro-1,4-endo-endo-5,8-dimethanonaphthalene)
Isodrin (1,2,3,4,10,10-hexachloro-1,4,4a,5,8,8a-hexahydro-1,4-endo-endo-5,8-dimethanonaphthalene)
Maneb (manganese ethylene bisdithiocarbamate)
Zineb (zinc analog of Maneb)
Naban (disodium analog of Maneb)
Ferbam (ferric dimethyl dithiocarbamate)
Ziran (zinc analog of Ferbam)
Captan (N-trichloromethylmercapto-4-cyclohexane-1,2-dicarboximide)
Karathane (2,4-dinitro-6-capryl phenol crotonate)
Aramite (butyl phenoxyisopropyl chloroethyl sulfite)
Ovotran (p-chlorophenyl-p-chlorobenzenesulphonate)
Sulphenone (p-chlorophenyl sulphone)
Dichlorophenyl benzenesulphonate
Parathion
Dimethyl parathion
Demeton (O,O-diethyl-O-2-ethylmercaptoethyl thiophosphate)
Octamethyl pyrophosphoramide
O,O-diethyl bis(dimethylamido) pyrophosphate, sym., and unsylm.
Diethoxythiophosphoryl tetramethyl-diamido phosphate
Alpha-diethoxyphosphinodithioacetylurea
Alpha-dimethoxyphosphinodithioacetylurea
Diethoxyphosphinodithioacetamide
Dimethoxyphosphinodithioacetamide
Bis(dimethylamido) phosphoryl fluoride
Bis(dimethylamido) phosphoryl azide
2-chlorovinyl diethyl phosphate
Dimetilan (Geigy)
Pyramat (Geigy)
Atrazine (Geigy)
2,4-D
2,4,5-T
Chloro IPC
Prometone (Geigy)
Nemagon (Shell)
Diuron (DuPont)
Monuron (DuPont)
Semizin (Geigy)
Dalapon (Dow)
EPTam (Stauffer), and the like
Aminotriazole
Thimet
Dowco 109 and its oxygen analog It has been found that rigid polyurethane foams may be conveniently prepared in an intimate admixture with non-volatile organic pesticides. In such formulations the polyurethane foam forms a protective cover around the pesticide.

While any rigid or even non-rigid polyurethane foam may be employed for the practice of the instant invention, the diverse nature and physical character of the foams which can be made, permit, advantageously, modification in the rate which the pesticide is released. Thus by selection of the polyurethane composition and control of the foaming, it is possible to predetermine the rate of pesticide release into the surrounding medium. It is believed that this aspect of the preparation is related to the nature of the cellular characteristics of the polyurethane. Closed cell foams such as can be prepared by methods well known in the polyurethane art yield a material of slow release characteristics. Closed cell foams are particularly suitable for liquid pesticides. In contrast, open cell polyurethanes provide a more rapidly available active ingredient. In addition to the control of product characteristics through the nature of the polyurethane foam, the product characteristics are also influenced by the particle size of the final polyurethane foam composition.

As is well known to the art, formation of polyurethane foams involves reaction between a polyfunctional organic isocyanate and a high molecular weight polyol which may contain terminal carboxyl groups in addition to the terminal hydroxyl groups.

Chain-extending urethane linkages are formed by reaction between isocyanate groups and hydroxy groups. Chain-extending amide linkages may be formed by reaction between isocyanate groups and carboxyl groups with simultaneous in situ evolution of carbon dioxide gas. Chain-extending urea linkages may also be formed by reaction between two isocyanate groups and one molecule of water with simultaneous in situ evolution of carbon dioxide gas. The carbon dioxide gas evolved by reaction between isocyanate groups and water and/or carboxyl groups expands to form the cell structure of the foam.

The present invention is applicable to polyurethane foams in which a reaction takes place between water and isocyanate groups to evolve carbon dioxide which expends to form the cell structure of the foam. Thus it is applicable to the so-called "single shot" method in which the poly-isocyanate is added to a mixture of polyol and chelate, additional water if necessary, and which mixture may also contain a catalyst and an emulsifier. The invention may also be employed in the so-called "prepolymer" method in which a poly-isocyanate and polyol are first reacted to obtain a prepolymer which is thereafter combined with the chelate, additional water if necessary, and usually a catalyst and emulsifier. The latter method is particularly suitable with polyethers such as polyalkylene glycols. The invention may also be practiced in continuous foam producing machines wherein separate streams of the polyol, polyisocyanate, catalyst, chelate, additional water if necessary, and emulsifier, or suitable mixtures thereof as noted above, are simultaneously injected into a mixing chamber which discharges into a mold. Standardized pastes or mixtures containing the chelate, additional water if necessary, and emulsifier or these together with the catalyst may be prepared and used advantageously.

The present invention is applicable also to polyurethanes formulated with other foaming expedients besides water. Thus, volatile ingredients like the fluorinated hydrocarbon refrigerants (Freon) may be incorporated into the formulation to serve as the foaming agent.

The physical and chemical properties of the polyurethane foams may be varied, as is well known, by varying the formulation, processing procedure, and reaction conditions. Poly-isocyanates suitable for making foams include among many others, tetramethylene diisocyanate, hexamethylene diisocyanate, m-phenylene diisocyanate, 2,4- and 2,6-tolylene diisocyanates, 3,3'-ditolylene-4,4'-diisocyanate, methylene di-p-phenyleneisocyanate, 1,5-naphthalene diisocyanate, and a triisocyanate prepared by reacting 3 mols of tolylene diisocyanate with one mol of hexanetriol.

Polyols suitable for making foams include (1) trihydric alcohols such as castor oil; (2) polyalkylene ether glycols prepared from ethylene, propylene or tetramethylene glycols, including polybutylene glycol of molecular weight 3,000 derived from 1,4-butylene glycol, known commercially as Teracol 30; and (3) polyesters which are the reaction products of dihydric alcohols and dicarboxylic acids, for example, polyesters prepared by copolymerizing a dicarboxylic acid such as adipic, phthalic, sebacic succinic, or oxalic acid with a glycol or polyalkylene glycol such as ethylene, diethylene, propylene and butylene glycols or obtained by copolymerizing ethylene glycol or glycerin with a mixture of phthalic and adipic acids; the last mentioned polyesters are alkyd resins.

In the production of flexible foams, from about 25 to 50 parts of diisocyanate are mixed per 100 parts of the polyol. For rigid foams, from about 60 to 225 parts of diisocyanate are employed per 100 parts of the polyol. In general, the lighter foams require more diisocyanate than the denser foams. It will be understood that the invention is not limited to these proportions of reactants.

Catalysts and emulsifiers are generally used to prepare low density flexible foams from polyester diols, but are used less often to prepare foams from polyether diols and alkyd resins. Preferred catalysts are the basic tertiary amine catalysts, such as N,N-diethylethanolamine, N-methyl morpholine, N,N-dimethylcyclohexylamine, and N-ethyl morpholine. The usual amount of the catalyst may be employed; in general up to 5% of catalyst based on the polyol will give satisfactory results.

Preferred emulsifiers are of the nonionic type such as a monoether of a polyethylene glycol with an alkyl phenol, blends of poly alcohol carboxylic acid esters and oil soluble sulfonates (Witco 77), polyethylene glycol ricinoleate (Emulphor EL–719), sorbitan monolaurate (Span 20), and poly oxy alkylene derivatives of sorbitan monolaurate (e.g., Tween 20 and Tween 80). Anionic emulsifiers such as sodium dioctyl sulfonsuccinate may also be used. In general the amount of emulsifier required does not exceed 10% based on the polyol.

The amount of water present where water is employed for foaming, including that introduced by the chelate, should be enough to react with the isocyanate to liberate sufficient gas to produce a foam of desired physical characteristics, e.g., density. The more water used, in general, the lower the density of the foam. From 0.5 to 10% of water based on the weight of isocyanate will generally give good results.

The temperatures of mixing the constituents and curing are those commonly used in the formation of polyurethane foams. The mixing of the constituents may be carried out under atmospheric conditions. The curing temperature will, of course, depend on the particular formulation. Typical curing conditions are given in the examples. If the pesticide is at all volatile at elevated foaming or curing tmeperatures, it may be advisable to employ the room temperature reacting prepolymer foam formulations.

Polyurethane foams prepared, for example, by the methods of the examples are readily comminuted into small granular particles by any of many conventional means such as a hammer mill, a roller mill, etc. to achieve granules or particles of a desired size range. The granules release the active ingredients to the surrounding medium at a rate which is a function of particle size as well as composition and physical properties (i.e., type of foam). Thus, a control on active ingredient release characteristics through the particle size of the preparation is possible.

In total, the nature of the components of the polyurethane mixture, the degree of pesticide loading in the composition, and control of cell size and structure permit the formulation of foam products even of specific gravities suitable for spray applications.

In passing, it is noteworthy that the polyurethane in its own right provides a measure of nutrient and adds some soil conditioning effect. Thus, the entire composition of pesticide and resin carrier is functional instead of being merely an active ingredient in an inert carrier.

The compositions of the instant invention provide for slow steady release of the active ingredients under all soil conditions. Their use eliminates the possibility of burning the plant through an accidental over-accumulation of the active ingredients. These compositions can be formulated in a manner which permits application without the dusting problems inherent in the use of many pesticides; indeed the composition may be suspended in a suitable fluid, notably water, and applied through spray techniques. Importantly, the composition of the instant invention are explicity intended for preparation according to the needs of localized conditions. These compositions are economic in their preparation and use by virtue of the high concentration of active ingredients present because high concentration permits an extremely light dusting or spraying; alternatively an extreme dilution of pesticide containing foam in a mixed fertilizer formulation can be employed.

For further understanding of the instant invention, reference is now made to the following examples which serve to illustrate the same, but which should not be construed in a limiting sense.

*Example I*

To a mixture of 60 g. of quadrol ($N_1N^1$-tetra-$\beta$-hydroxyethylethylenediamine) containing 23.7 g. of Freon 113 (1,1,2-trichloro-1,2,2-trifluoroethane) and 0.1 g. of L–520, silicone stabilizer was added 135 g. of DDT powder. The mixture was stirred to a homogeneous paste. To the paste was added 51 g. of toluene diisocyanate. The combination was rapidly mixed until homogeneous. A vigorous exothermic reaction took place with formation of a typical high density rigid polyurethane foam. After eight hours of drying at ambient temperature, the foam could be readily cut, ground or milled to any desired particle size. This is a typical composition of 50% active ingredient loading.

*Example II*

A homogeneous suspension of 60 g. quadrol, 40 g. castor oil, 20 g. diallylphthalate, 0.5 g. water and 188 g. of lindane was blended with 67 g. of toluene diisocyanate. As in the previous example, the ensuing spontaneous reaction produced a polyurethane foam. This foam was readily broken into granular particles suitable for the objective of this invention.

*Example III*

A mixture of 30 g. of castor oil, 0.5 g. of EL–719, a surfactant, 1 g. of ethyl cellulose, 10 g. of quadrol, 5 g. of glyceryl monorincinoleate, 0.5 g. of water and 127 g. of methoxychlor was blended with 75 g. of toluene diisocyanate. Following the exothermic reaction, the foam was pulverized in a hammer mill to a fine powder. The powder with a specific gravity of 1.0 proved an easily sprayed aqueous suspension for spray application.

*Example IV*

By the procedure of Example I using 162 g. of 2,4–D, a 60% active ingredient granulated product was prepared.

*Example V*

By the procedure of Example III the addition of 148 g. of dimetilan provided a 60% by weight pesticide product. Similarly, atrazine, prometone and simazine were incorporated in the polurethane foam.

*Example VI*

A prepolymer made by mixing a sorbitol-propylene oxide polyether (Atlas Powder Co. G–2410) in a proportion of about 100 parts fo polyether to 340 parts of 80–20 toluene diisocyanate is admixed with equal amounts of a polyether mixture containing 53% polyether (G–2410), 16% catalyst (diethylene triamine), 1% silicone oil "L–520" (Union Carbide) and 30% trichloromono-fluoromethane (blowing agent) and 60 parts of Diazinon [O,O - diethyl O - (2 - isopropyl-4-methyl-6 pyrimidinyl) phosphorothioate]. A brisk foaming commenced quickly and the foam product was cured for an hour at ambient temperature.

In place of Diazinion the same quantities of chlorobenzilate, dimetilan, isolan, pyramat, malathion and sulphenone, respectively, were formulated in the polyurethane foam.

The foam products of Examples I to VI were found to release their pesticide content only gradually under field conditions, resulting in effective pesticidal action over an extended period of time.

The foregoing examples have been presented for illustrative purposes only and numerous changes can be made in the proportions, conditions and ingredients set forth without departing from the spirit of the invention as defined in the appended claims.

What is claimed is:
1. A pesticide composition adapted to slowly release pesticide throughout a growing season of a plant consisting essentially of a polyurethane foam containing dispersed therein an organic non-volatile pesticide in an amount ranging from 25% to 75% by weight of the composition, the polyurethane forming a protective coating around the pesticide.
2. The pesticide composition of claim 1 wherein the pesticide is O,O-diethyl O-(2-isopropyl-4-methyl-6 pyrimidnyl) phosphorothioate.
3. A method for supplying pesticide to field plants which comprises applying thereto a pesticide composition adapted to slowly release pesticide throughout the plant growing season consisting essentially of a polyurethane foam containing dispersed therein an organic non-volatile pesticide in an amount ranging from 25% to 75% by weight of the composition, the polyurethane forming a protective coating around the pesticide.

References Cited by the Examiner

UNITED STATES PATENTS

| | | | |
|---|---|---|---|
| 2,754,243 | 7/1956 | Gysin | 167—33 |
| 2,988,441 | 6/1961 | Pruitt | 71—2.7 |
| 3,006,870 | 10/1961 | Steinfatt | 167—42 |
| 3,074,845 | 1/1963 | Geary | 167—42 |
| 3,085,984 | 4/1963 | Degener et al. | 167—42 |
| 3,127,312 | 3/1964 | Boyer | 167—42 |

FOREIGN PATENTS 597,262  5/1960  Canada.

JULIAN S. LEVITT, *Primary Examiner.*

GEORGE A. MENTIS, *Assistant Examiner.*